Patented Feb. 25, 1930

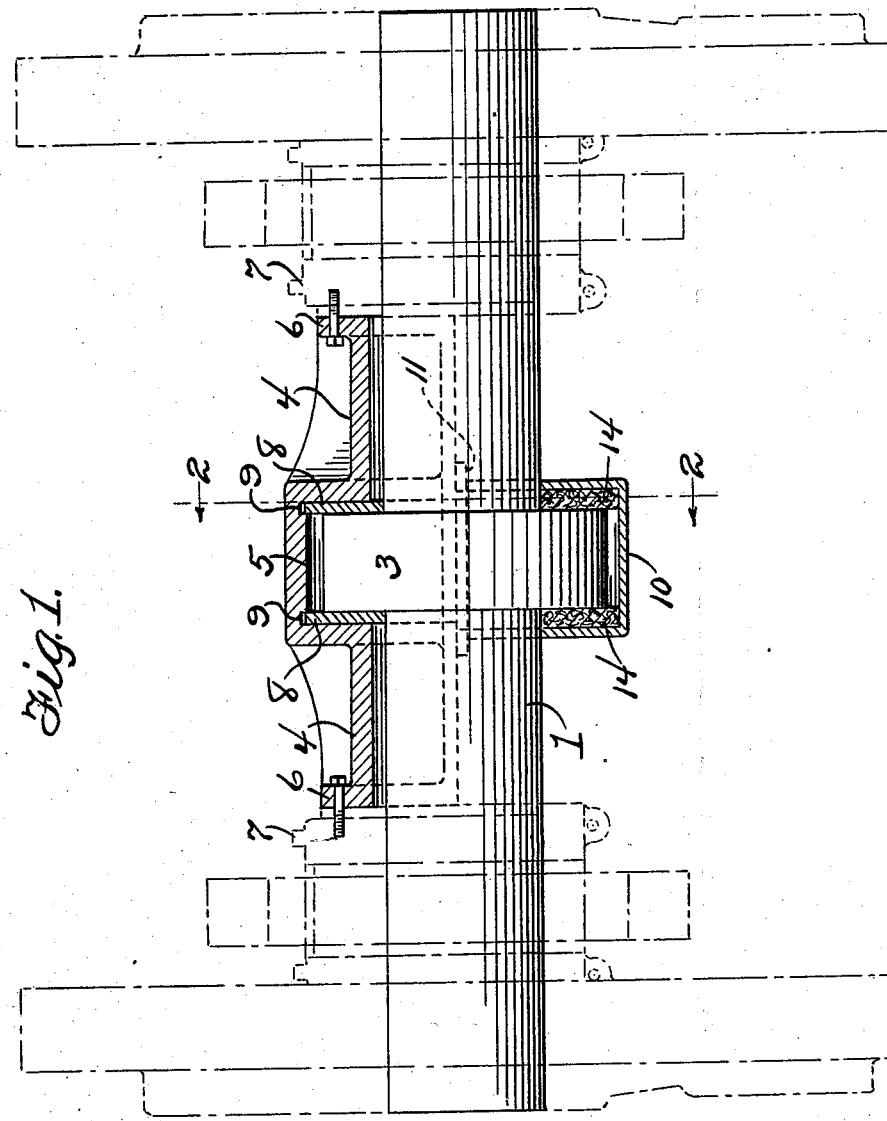

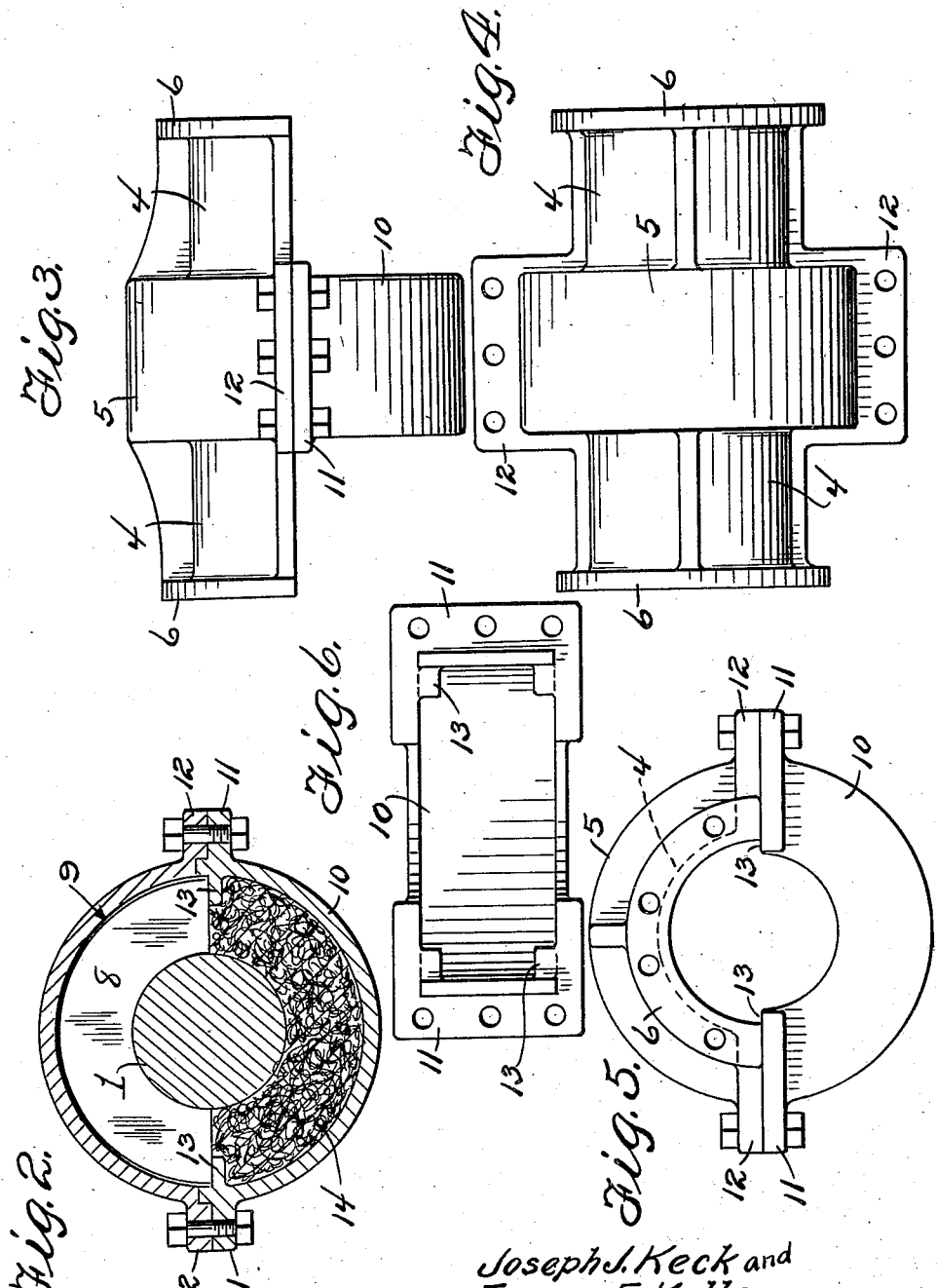

1,748,674

UNITED STATES PATENT OFFICE

JOSEPH J. KECK AND ERNEST E. KELLEY, OF PARSONS, KANSAS

LATERAL ELIMINATOR

Application filed December 26, 1928. Serial No. 328,531.

This invention relates to means for preventing lateral movement of the truck and drive wheels of locomotives and the like, the objects of our invention being first, to eliminate the clearance now required on locomotive truck and drive wheels; second, to eliminate the use of hub plates on the journal boxes and wheel faces; third, to render it unnecessary to drop the wheels to take up lateral movement; fourth, to reduce wear on main and side rods, and fifth, to make the locomotive ride smoother.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a view showing a pair of wheels and their axle in dotted lines, with the invention in section.

Figure 2 is a section on line 2—2 of Figure 1.

Figure 3 is a front view of the housing and the oil pan.

Figure 4 is a plan view of Figure 3.

Figure 5 is an end view.

Figure 6 is a plan view of the oil pan.

As shown in these drawings, the axle 1 is formed with an annular central enlargement 3 and we provide a housing or casting 4 which is formed with a semi-circular bore in each end part for receiving portions of the axle and with a centrally arranged large chamber 5 of semi-circular shape for receiving a portion of the enlargement 3. This housing is formed with flanges 6 at its ends which are bolted to the boxes 7 so that the housing extends from one box to the other and is supported by said boxes.

A pair of semi-circular liners 8, preferably formed of brass, is placed at the sides of the chamber 5, the chamber being formed with the grooves 9 to receive portions of the liners. These liners fit between the side walls of the chamber and the sides of the enlargement, with a slight clearance, thus forming bearings which prevent shifting or sliding of the boxes on their bearings and hold the locomotive frame in a central position. A very accurate adjustment of the amount of lateral may be had by changing the thickness of the liners. The liners are held in place by an oil pan 10 of semi-circular shape which is formed with the flanges 11 at its ends which are bolted to flanges 12 on the housing, the oil pan being formed with the internal lips 13 which form rests for the liners. Semi-circular washers 14 of felt or the like are placed in the oil pan, one at each side thereof, to prevent the lubricant in the pan from running out, these washers fitting tightly against the axle and in groves formed in the housing. These washers also keep dirt from getting into the pan. The liners may be removed and substituted by new ones by removing the oil pan.

Thus it will be seen that we have provided simple means for eliminating lateral movement of the locomotive truck and drive wheels and that the amount of lateral can be accurately adjusted by using the proper sizes of liners.

It is thought from the foregoing description that the advantages and novel features of the invention will be readily apparent.

It is to be understood that changes may be made in the construction and in the combination and arrangement of the several parts, provided that such changes fall within the scope of the appended claims.

What we claim is:—

1. In combination with an axle and its journal boxes, said axle having a centrally arranged circular enlargement, a housing extending between the boxes and secured at its ends thereto and having a semi-circular chamber therein for receiving portions of the enlargement and liners in the chamber between the enlargement and the side walls of said chamber.

2. In combination with an axle and its journal boxes, said axle having a centrally arranged circular enlargement, a housing extending between the boxes and secured at its ends thereto and having a semi-circular chamber therein for receiving portions of the enlargement, liners in the chamber between the enlargement and the side walls of said chamber and an oil pan detachably connected with the lower portions of the chamber and receiving a portion of the enlargement and means carried by the pan for holding the liners in place.

3. In combination with an axle and its journal boxes, said axle having a centrally arranged circular enlargement, a housing extending between the boxes and secured at its ends thereto and having a semi-circular chamber therein for receiving portions of the enlargement, liners in the chamber between the enlargement and the side walls of said chamber, an oil pan detachably connected with the lower portions of the chamber and receiving a portion of the enlargement, means carried by the pan for holding the liners in place and washers in the oil pan, one at each side thereof and bearing against the axle for holding lubricant in the pan.

In testimony whereof we affix our signatures.

JOSEPH J. KECK.
ERNEST E. KELLEY.